(12) United States Patent
Fesler (10) Patent No.: US 10,094,648 B2
(45) Date of Patent: Oct. 9, 2018

(54) HOMODYNE OPTICAL SENSOR SYSTEM INCORPORATING A MULTI-PHASE BEAM COMBINING SYSTEM

(71) Applicant: Keysight Technologies, Inc., Minneapolis, MN (US)

(72) Inventor: Kenneth Alan Fesler, Sunnyvale, CA (US)

(73) Assignee: Keysight Technologies, Inc., Loveland, CO (US)

(*) Notice: Subject to any disclaimer, the term of this patent is extended or adjusted under 35 U.S.C. 154(b) by 37 days.

(21) Appl. No.: 15/199,102

(22) Filed: Jun. 30, 2016

(65) Prior Publication Data
US 2018/0003480 A1    Jan. 4, 2018

(51) Int. Cl.
| | |
|---|---|
| G01B 9/02 | (2006.01) |
| G02B 27/28 | (2006.01) |
| G02B 27/10 | (2006.01) |
| G02B 5/30 | (2006.01) |
| G01B 11/14 | (2006.01) |

(52) U.S. Cl.
CPC ............ *G01B 9/02011* (2013.01); *G01B 9/02016* (2013.01); *G01B 11/14* (2013.01); *G02B 5/3083* (2013.01); *G02B 27/1086* (2013.01); *G02B 27/283* (2013.01)

(58) Field of Classification Search
CPC ............. G02B 27/283; G02B 5/3083; G02B 27/1086; G01B 11/14; G01B 9/02016; G01B 9/02011
See application file for complete search history.

(56) References Cited

U.S. PATENT DOCUMENTS

| | | | | |
|---|---|---|---|---|
| 3,520,615 A | * | 7/1970 | Smith ............... | G01J 9/02 356/453 |
| 4,558,952 A | * | 12/1985 | Kulesh ............. | G01J 9/04 356/486 |
| 5,392,116 A | | 2/1995 | Makosch | |

(Continued)

OTHER PUBLICATIONS

Shuangshuang Zhao, Nanometer-scale displacement sensor based on phase-sensitive diffraction grating, Apr. 1, 2011, Applied Optics, Optical Society of America, pp. 1413-1416.

(Continued)

*Primary Examiner* — Hwa Lee (57) ABSTRACT

Generally, in accordance with the various illustrative embodiments disclosed herein, a homodyne optical interferometer can include a multi-phase beam combining system that receives a composite beam from an optical beam guidance system and uses a diffraction grating to produce a diffracted plurality of light beam members. Each of the diffracted plurality of light beam members is propagated through a birefringent optical element that imposes a differential phase shift on each member based on polarization and differing optical path lengths. In one example implementation, the birefringent optical element can be a parallel plate optical element arranged at an angle with respect to a light-propagation axis of the multi-phase beam combining system and in a second example implementation, the birefringent optical element can be a multifaceted optical element having a first planar external surface that is sloped with respect to an opposing external planar surface.

17 Claims, 5 Drawing Sheets

(56) References Cited

U.S. PATENT DOCUMENTS

| | | | |
|---|---|---|---|
| 6,992,778 B2* | 1/2006 | Nahum | G01B 9/02004 |
| | | | 356/512 |
| 7,170,611 B2 | 1/2007 | Millerd | |
| 7,433,048 B2 | 10/2008 | Park | |
| 2002/0003628 A1* | 1/2002 | James | G01B 11/2441 |
| | | | 356/521 |
| 2003/0053071 A1* | 3/2003 | James | G01B 11/2441 |
| | | | 356/491 |
| 2009/0073457 A1* | 3/2009 | Nakata | G01B 9/02018 |
| | | | 356/498 |
| 2010/0039652 A1* | 2/2010 | Nakata | G03F 7/70775 |
| | | | 356/487 |
| 2012/0327429 A1* | 12/2012 | Nakata | B82Y 35/00 |
| | | | 356/614 |

OTHER PUBLICATIONS

Qiangxian Huang, Homodyne laser interferometric displacement measuring system with nanometer accuracy, Ninth International Conf Electronic Meas & Instr Aug. 16-19, 2009.

* cited by examiner

HOMODYNE OPTICAL SENSOR SYSTEM INCORPORATING A MULTI-PHASE BEAM COMBINING SYSTEM

BACKGROUND

An optical interferometer generally uses two optical beams (a measurement beam and a reference beam) to perform a distance measurement. When the two optical beams have the same wavelength, the optical interferometer is known as a homodyne optical interferometer. A traditional homodyne optical interferometer typically includes several bulk optic devices such as a non-polarizing beam splitter, a wave plate, and a polarizing beam splitter. These optical components can not only be expensive in themselves, but can also necessitate the use of mechanical mounts for providing precise optical alignment, thereby further adding to the cost, as well as space requirements, of a traditional homodyne optical interferometer.

SUMMARY

Certain embodiments of the disclosure can provide a technical effect and/or solution to incorporate a multi-phase beam combining system into a homodyne optical interferometer. The multi-phase beam combining system can be housed in a compact package that provides various cost and ease-of-use benefits.

According to one exemplary embodiment of the disclosure, a homodyne interferometer includes an optical beam guidance system and a multi-phase beam combining system. The optical beam guidance system portion of the homodyne interferometer is configured to receive a coherent beam of light; split the coherent beam of light into a first light component having a first polarization and a second light component having a second polarization; direct the first light component towards a reference object; direct the second light component towards a target object; receive from the reference object, a first reflected light component having the first polarization; receive from the target object, a second reflected light component having the second polarization; and output a composite beam that includes the first reflected light component having the first polarization and the second reflected light component having the second polarization. The multi-phase beam combining system portion of the homodyne interferometer includes a diffraction grating, a birefringent optical element, a polarizer, and a focusing lens. The diffraction grating is arranged to receive the composite beam from the optical beam guidance system and to produce therefrom, a diffracted plurality of light beam members. The birefringent optical element is arranged to receive the diffracted plurality of light beam members from the diffraction grating and to propagate each of the diffracted plurality of light beam members over a respective optical path through the birefringent optical element, each of the diffracted plurality of light beam members having the first polarization undergoing a differential phase shift with respect to each of the diffracted plurality of light beam members having the second polarization, the differential phase shift based at least in part on an angular inclination of at least one major external surface of the birefringent optical element with respect to a light-propagation axis of the multi-phase beam combining system. The polarizer is arranged to receive the diffracted plurality of light beam members after propagation through the birefringent optical element and to provide an interferometric effect that is indicative of in-phase and out-of-phase relationships in the diffracted plurality of light beam members. The focusing lens is arranged to receive the diffracted plurality of light beam members after propagation through the polarizer and to at least direct a first subset of light beams towards a first focal point and a second subset of light beams towards a second focal point.

According to another exemplary embodiment of the disclosure a homodyne interferometer includes an optical beam guidance system and a multi-phase beam combining system. The optical beam guidance system portion of the homodyne interferometer is configured to output a composite beam that includes a first reflected light component having a first polarization and a second reflected light component having a second polarization. The multi-phase beam combining system portion of the homodyne interferometer includes a diffraction grating, a birefringent optical element, a polarizer, and a focusing lens. The diffraction grating is arranged to receive the composite beam from the optical beam guidance system and to produce therefrom, a diffracted plurality of light beam members. The birefringent optical element is arranged to receive the diffracted plurality of light beam members from the diffraction grating and to propagate each of the diffracted plurality of light beam members over a respective optical path through the birefringent optical element, each of the diffracted plurality of light beam members having the first polarization undergoing a differential phase shift with respect to each of the diffracted plurality of light beam members having the second polarization, the differential phase shift based at least in part on an angular inclination of at least one major external surface of the birefringent optical element with respect to a light-propagation axis of the multi-phase beam combining system. The polarizer is arranged to receive the diffracted plurality of light beam members after propagation through the birefringent crystal and to provide an interferometric effect that is indicative of in-phase and out-of-phase relationships in the diffracted plurality of light beam members. The focusing lens is arranged to receive the diffracted plurality of light beam members after propagation through the polarizer and to at least direct a first subset of light beams towards a first focal point and a second subset of light beams towards a second focal point According to yet another exemplary embodiment of the disclosure, a method can include receiving in a diffraction grating of a multi-phase beam combining system, a composite beam that includes a first reflected light component having a first polarization and a second reflected light component having a second polarization; using the diffraction grating to generate from the composite beam, a diffracted plurality of light beam members; directing the diffracted plurality of light beam members from the diffraction grating to a birefringent optical element of the multi-phase beam combining system; propagating each of the diffracted plurality of light beam members over a respective optical path through the birefringent optical element, each of the diffracted plurality of light beam members having the first polarization undergoing a differential phase shift with respect to each of the diffracted plurality of light beam members having the second polarization, the differential phase shift based at least in part on an angular inclination of at least one major external surface of the birefringent optical element with respect to a light-propagation axis of the multi-phase beam combining system; receiving in a polarizer of the multi-phase beam combining system, the diffracted plurality of light beam members after propagation through the birefringent crystal; using the polarizer to generate an interferometric effect that is indicative of in-phase and out-of-phase relationships in the diffracted plurality of light beam members; receiving in a focusing lens of the multi-phase beam combining system, the diffracted plurality of light beam members after propagation through the polarizer; and using the focusing lens to at least direct a first subset of light beams towards a first focal point and a second subset of light beams towards a second focal point.

Furthermore, in one example implementation in accordance with the disclosure, the birefringent optical element referred to above is a parallel plate optical element arranged at an angle with respect to a light-propagation axis of the multi-phase beam combining system. In another example implementation in accordance with the disclosure, the birefringent optical element referred to above is a multifaceted optical element comprising a sloping planar surface having a slope angle with respect to a light-propagation axis of the multi-phase beam combining system. Other embodiments and aspects of the disclosure will become apparent from the following description taken in conjunction with the following drawings.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale; emphasis instead being placed upon illustrating the principles of the invention. The drawings should not be interpreted as limiting the scope of the invention to the example embodiments shown herein.

DETAILED DESCRIPTION

Throughout this description, embodiments and variations are described for the purpose of illustrating uses and implementations of inventive concepts. The illustrative description should be understood as presenting examples of inventive concepts, rather than as limiting the scope of the concepts as disclosed herein. Towards this end, certain words and terms are used herein solely for convenience and such words and terms should be broadly understood as encompassing various objects and actions that are generally understood in various forms and equivalencies by persons of ordinary skill in the art. For example, words such as "horizontal," "vertical," "angle," and "transverse" that pertain to the orientation of an object in one direction can be understood to correspond to other equivalently applicable words when the object is re-oriented in a different direction. It should also be understood that the word "example" as used herein is intended to be non-exclusionary and non-limiting in nature. More particularly, the word "exemplary" as used herein indicates one among several examples and it should be understood that no special emphasis, exclusivity, or preference, is associated or implied by the use of this word.

Generally, in accordance with the various illustrative embodiments disclosed herein, a homodyne optical interferometer incorporates a multi-phase beam combining system that can be housed in a compact package. The compact package provides various cost benefits and ease-of-use benefits in comparison to traditional devices. For example, the compact package eliminates the need for multiple mechanical mounts, as well as optical alignment procedures that are associated with traditional interferometers. The homodyne optical interferometer in accordance with the disclosure can further incorporate an optical beam guidance system that outputs a composite beam containing a first light component having a first polarization and a second reflected light component having a second polarization. The multi-phase beam combining system receives the composite beam from the optical beam guidance system and uses a diffraction grating to produce a diffracted plurality of light beam members. A birefringent optical element receives the diffracted plurality of light beam members and propagates each of the light beam members over a respective optical path thereby imposing a differential phase shift based on various factors such as polarization and differing optical path lengths.

In a first example implementation in accordance with the disclosure, the birefringent optical element is a parallel plate optical element arranged at an angle with respect to a light-propagation axis of the multi-phase beam combining system. The angular arrangement imposes a differential phase shift on each of the plurality of light beam members based at least in part on the first polarization and the second polarization. In a second example implementation in accordance with the disclosure, the birefringent optical element is a multifaceted optical element having a first external planar surface that is sloped with respect to an opposing external planar surface. Such a configuration also imposes a differential phase shift on each of the plurality of light beam members that is based at least in part on the different optical path lengths provided by the multifaceted optical element.

Figure 1:
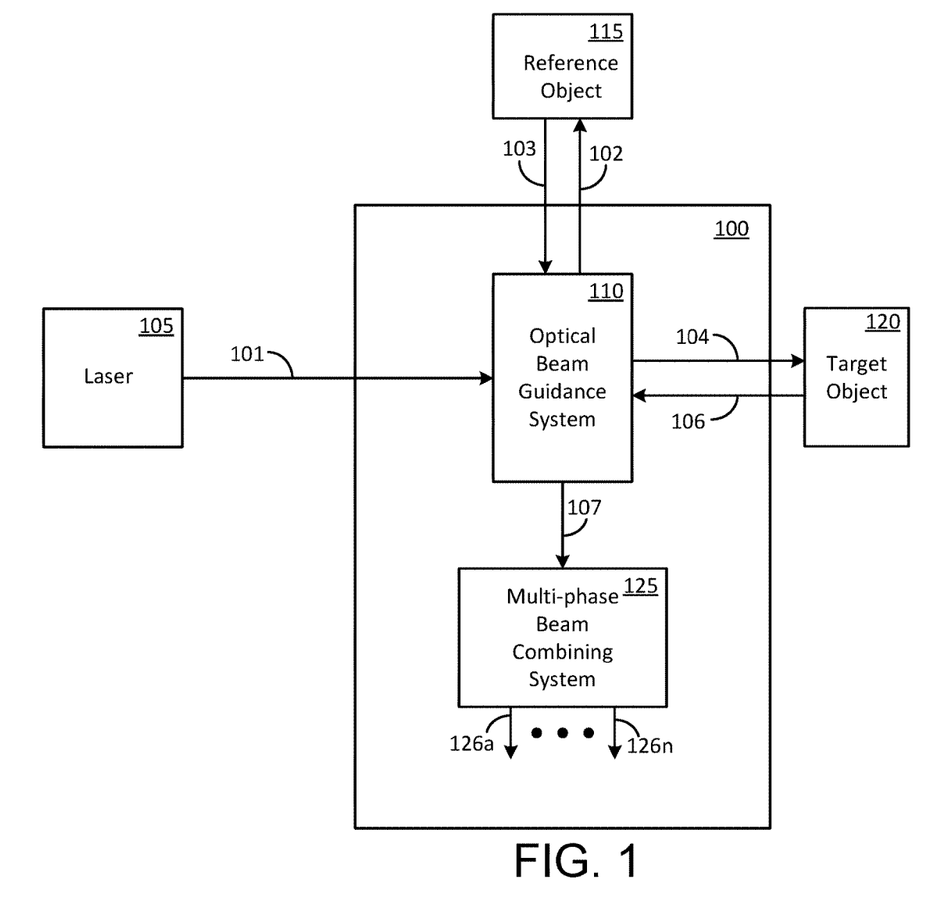
FIG. 1 shows an exemplary homodyne optical interferometer incorporating a multi-phase beam combining system in accordance with the disclosure.

Attention is now drawn to FIG. 1, which shows an exemplary homodyne optical interferometer 100 incorporating a multi-phase beam combining system 125 in accordance with the disclosure. A laser 105 can be used to provide a coherent beam of light 101 to the homodyne optical interferometer 100 at a predefined optical wavelength. The coherent beam of light 101 is directed towards an optical beam guidance system 110 of the homodyne optical interferometer 100. The optical beam guidance system 110 splits the coherent beam of light into a first light component 102 that is directed towards a reference object 115 and a second light component 104 that is directed towards a target object 120. The reference object 115, which is typically at a fixed distance from the optical beam guidance system 110, reflects the first light component 102 and provides to the optical beam guidance system 110, a first reflected light component 103 having a first polarization. The target object 120 reflects the second light component 104 and provides to the optical beam guidance system 110, a second reflected light component 106 having a second polarization.

The optical beam guidance system 110 combines the first reflected light component 103 and the second reflected light component 106 to create a composite beam 107 that is provided to the multi-phase beam combining system 125. The composite beam 107 thus includes the first reflected light component 103 having a first polarization at the predefined optical wavelength and the second reflected light component 106 having a second polarization at the same predefined optical wavelength.

When the target object 120 is a moving object, the homodyne optical interferometer 100 can be used to determine a change in distance between the target object 120 and the optical beam guidance system 110, and to also determine whether the target object 120 is moving away from the optical beam guidance system 110 or moving towards the optical beam guidance system 110.

Towards this end, the multi-phase beam combining system 125 of the homodyne optical interferometer 100 can be used to generate several combinatorial light beams 126a through 126n (n≥2) that can be provided to a number of photodetectors (not shown). The photodetectors can be used to determine distance and direction parameters based on interferometric patterns generated in the multi-phase beam combining system 125. These aspects will be further understood in view of the description provided below.

Figure 2:
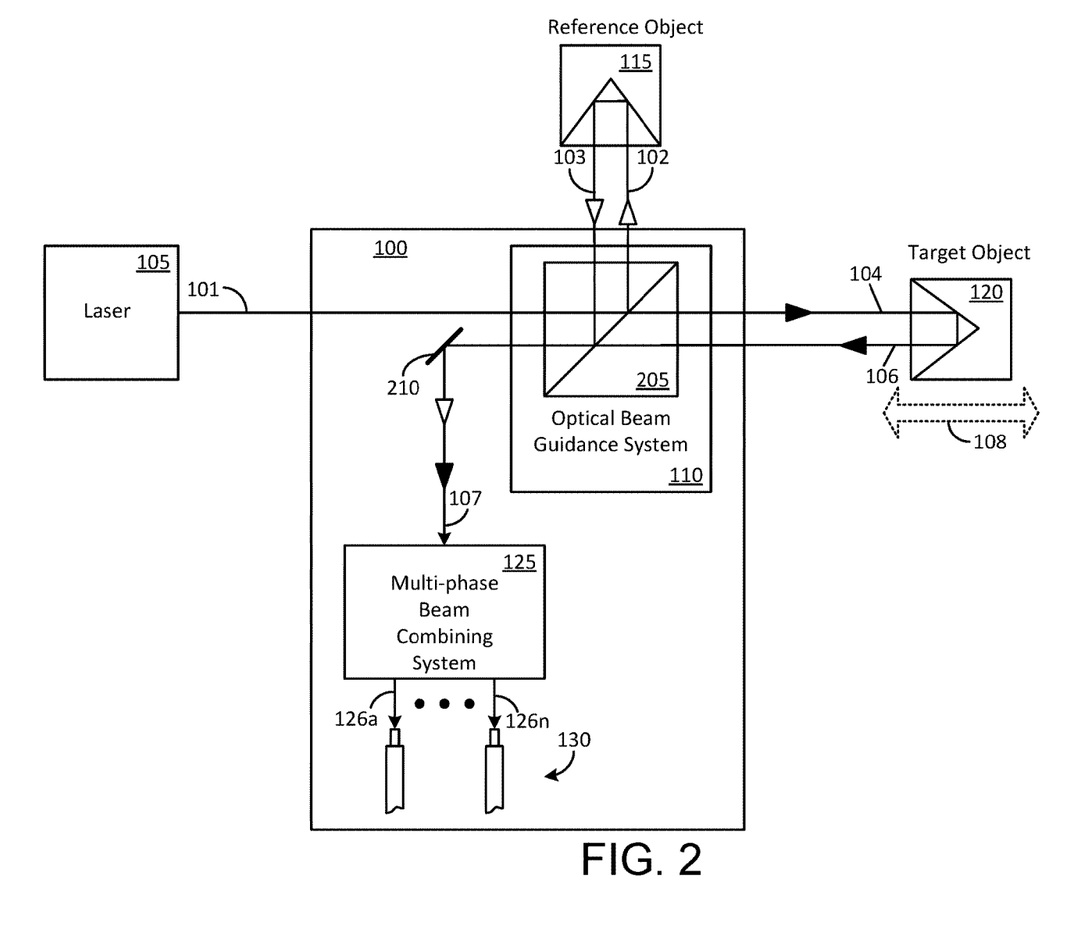
FIG. 2 illustrates some additional details of the exemplary homodyne optical interferometer shown in FIG. 1.

FIG. 2 illustrates some additional details of the homodyne optical interferometer 100. In this example embodiment, the optical beam guidance system 110 includes a beam splitter element 205 that redirects the first light component 102 of the coherent beam of light 101 orthogonally towards the reference object 115 and propagates the second light component 104 of the coherent beam of light 101 without redirection, towards the reference object 115. The reference object 115 incorporates a reflecting structure that redirects the first light component 102 back towards the optical beam guidance system 110 in the form of the first reflected light component 103. The target object 120, which is capable of movement bi-directionally (as indicated by the bi-directional arrow 108), also incorporates a reflecting structure that redirects the second light component 104 back towards the optical beam guidance system 110 in the form of the second reflected light component 106.

The beam splitter element 205 then produces the composite beam 107 by combining the first reflected light component 103 and the second reflected light component 106. The combining is carried out by redirecting the first reflected light component 103 in an orthogonal direction towards a reflector element 210, and by propagating, without redirection, the second reflected light component 106 towards the reflector element 210 as well. The orientation of each of the reflecting structure of the reference object 115 and the reflecting structure of the target object 120 with respect to the beam splitter element 205 is such that the first reflected light component 103 and the second reflected light component 106 are optically aligned to form the composite beam 107. The reflector element 210 is also oriented such that the composite beam 107 that is propagated from the optical beam guidance system 110 is directed towards the multi-phase beam combining system 125.

In this example embodiment, the "n" combinatorial light beams 126a through 126n (n≥2) that are output from the multi-phase beam combining system 125 are directed into "n" optical fibers 130. In other embodiments, the "n" optical fibers 130 can be replaced by "n" photodetectors.

Figure 3:
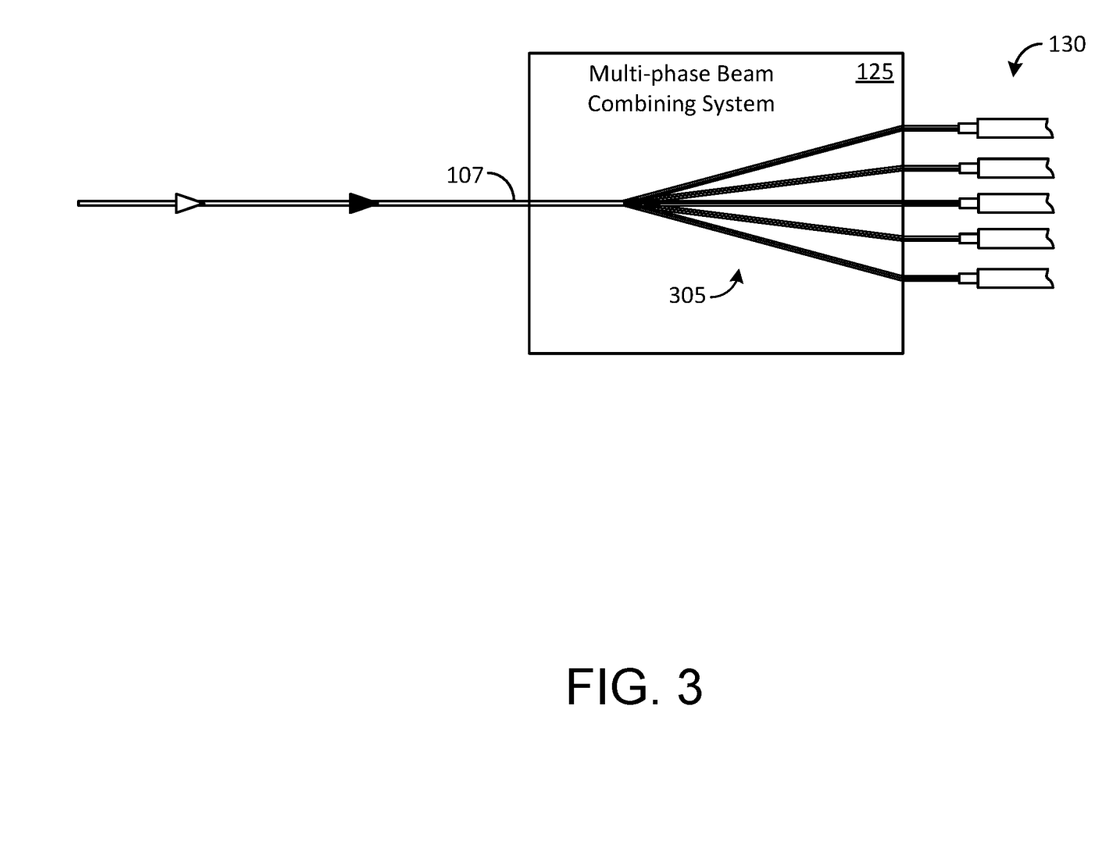
FIG. 3 shows a functional representation of a multi-phase beam combining system in accordance with the disclosure.

FIG. 3 shows a functional representation of a multi-phase beam combining system 125 in accordance with the disclosure. The composite beam 107 is split into multiple light beam members 305 on the basis of a differential phase shift based on polarization and differing optical path lengths. Individual members of the multiple light beam members 305 are then combined into specific subsets of light beams by using an optical combining arrangement that will be described below in more detail, and the subset of light beams are coupled into the "n" optical fibers 130.

Figure 4:
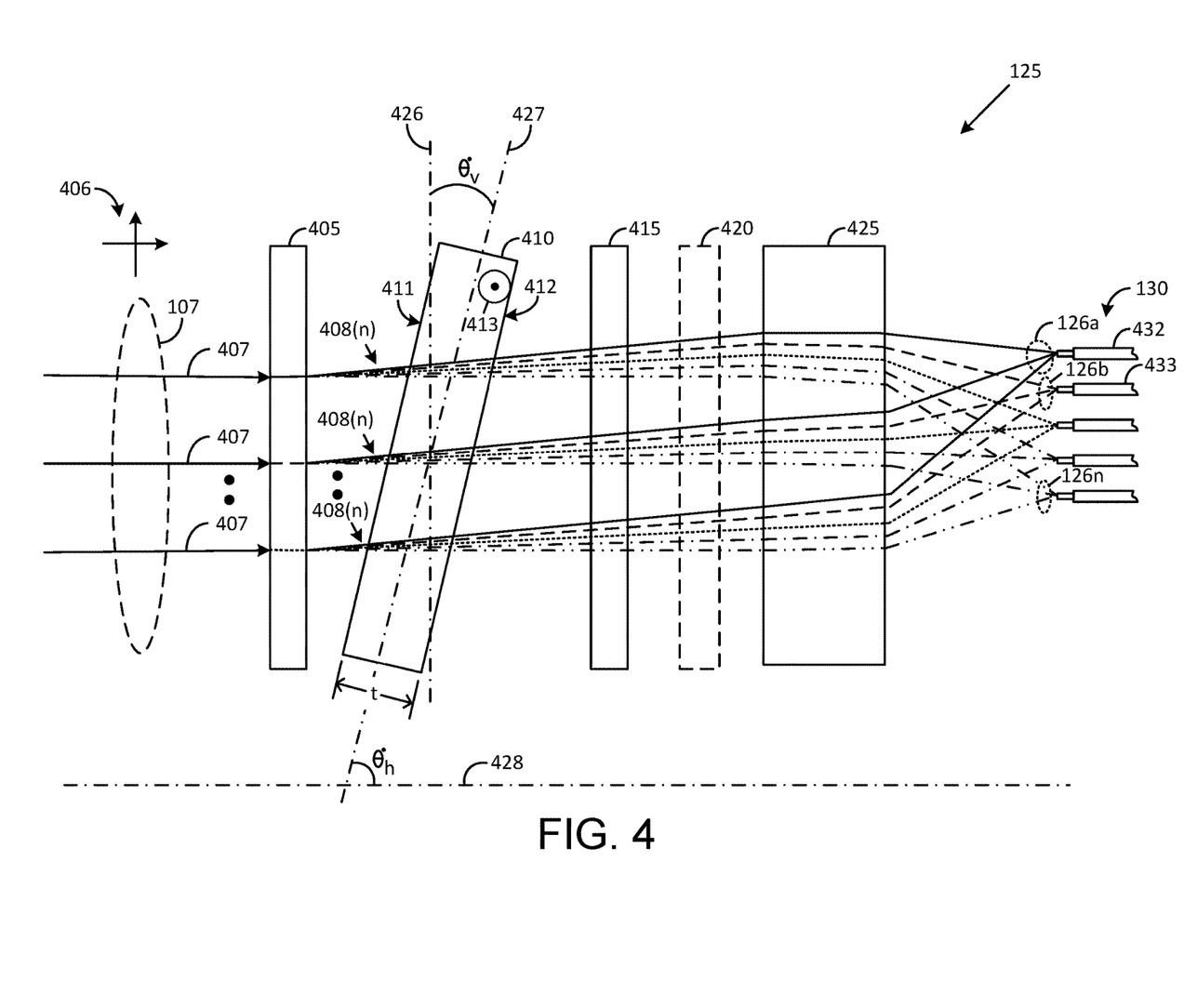
FIG. 4 shows an exemplary embodiment of a multi-phase beam combining system in accordance with the disclosure.

FIG. 4 shows an exemplary embodiment of a multi-phase beam combining system 125 in accordance with the disclosure. In this exemplary embodiment, the multi-phase beam combining system 125 includes a diffraction grating 405, a birefringent optical element 410, a polarizer 415, and a focusing lens 425. The multi-phase beam combining system 125 can optionally include a quarter-wave plate 420 in some implementations.

The diffraction grating 405 is arranged to receive the composite beam 107 from the optical beam guidance system 110. As described above, the composite beam 107 includes the first reflected light component 103 having a first polarization at the predefined optical wavelength and the second reflected light component 106 having a second polarization at the same predefined optical wavelength. In this exemplary embodiment, the first polarization and the second polarization characteristic of the composite beam 107 is indicated as having an orthogonal polarization relationship 406. The vertical arrow that represents the first polarization, is oriented perpendicular to an optical axis 413 of the birefringent optical element 410, and the horizontal arrow that represents the second polarization, is oriented parallel to the optical axis 413 of the birefringent optical element 410 (the optical axis 413 projects out of the page). In other embodiments, the composite beam 107 can include two or more light components having other polarization relationships.

It should be understood that purely as a matter of convenience, the composite beam 107 is depicted in FIG. 4 as having three light rays 407. It should be understood however that the composite beam 107 includes a very large number of such light rays. Each of the light rays 407 is diffracted by the diffraction grating 405 to produce "n" diffracted light beam members 408(n) that are directed towards the birefringent optical element 410.

In this exemplary embodiment, the birefringent optical element 410 is a parallel plate optical element having a first external major surface 411 aligned parallel with an opposing external major surface 412. Each of the "n" diffracted light beam members 408(n) is incident upon the first external major surface 411 of the birefringent optical element 410 after having propagated through different optical path lengths as a result of an angular orientation ($\theta°_h$) of a longitudinal axis 427 of the birefringent optical element 410 with respect to a light-propagation axis 428 of the multi-phase beam combining system 125. As used herein, the longitudinal axis 427 is oriented along the plane of the page and perpendicular to the optical axis 413 of the birefringent optical element 410, while the light-propagation axis 428 indicates a general direction of travel of the composite beam 107 through the multi-phase beam combining system 125 along the plane of the page (i.e., with a left-to-right horizontal direction of travel in the exemplary embodiment shown in FIG. 4). The angular orientation ($\theta°_h$) of the birefringent optical element 410, which can range from less than 90 degrees to greater than 0 degrees, can be alternatively defined in the form of another angular orientation ($\theta°_v$) of the longitudinal axis 427 of the birefringent optical element 410 with respect to a transverse axis 426 that is perpendicular to the light-propagation axis 428. The angular orientation ($\theta°_v$) of the birefringent optical element 410 can range from less than 90 degrees to greater than zero degrees. In general, the angular orientation ($\theta°_v$) of the birefringent optical element 410 with respect to the transverse axis 426 can be provided on the basis of one or more parameters, such as the wavelength of the composite beam 107, a thickness "t" of the birefringent optical element 410, the amount of birefringence provided by the birefringent optical element 410, the nature of an anti-reflection coating applied to the birefringent optical element 410, and mechanical mounting considerations. In one exemplary implementation, the angular orientation ($\theta°_y$) of the birefringent optical element 410 can range from about 25 degrees to about 65 degrees. In another exemplary implementation, the angular orientation ($\theta°_y$) of the birefringent optical element 410 is substantially equal to 45 degrees.

Each of the "n" diffracted light beam members 408(n) having the first polarization undergoes a differential phase shift with respect to each of the "n" diffracted light beam members 408(n) having the second polarization, in the birefringent optical element 410. The magnitude of the differential phase shift is influenced by various parameters, that can include the angular orientation ($\theta°_y$) of the birefringent optical element 410, the thickness "t" of the birefringent optical element 410, and/or an optical path length associated with each of the "n" diffracted light beam members 408(n) during propagation from the diffraction grating 405 to the first external major surface 411 of the birefringent optical element 410. In one exemplary implementation, the birefringent optical element 410 is selected to have a thickness "t" and angular orientation ($\theta°_y$) that provides a differential phase shift of approximately 90 degrees between any one diffracted light beam member having the first polarization and another diffracted light member having the second polarization. In other exemplary implementations, the birefringent optical element 410 can be selected to have a different thickness "t" and a different angular orientation ($\theta°_y$) that provides a differential phase shift other than 90 degrees based on the first and the second polarization among the "n" diffracted light beam members 408(n). In general, the differential phase shift that is created between any two neighboring diffracted light beam members of the "n" diffracted light beam members 408(n) is based, at least in part, on an ordinary optical index and an extraordinary optical index of the birefringent optical element 410. Specifically, when the first reflected light component 103 having the first polarization is affected by the ordinary optical index of the birefringent optical element 410, the second reflected light component 106 having the second polarization is affected by the extraordinary optical index of the birefringent optical element 410.

It can be understood that in this exemplary embodiment, each of the "n" diffracted light beam members 408(n) corresponding to the top-most light ray 407 propagates over a longer distance between the diffraction grating 405 and the birefringent optical element 410 in comparison to each of the other "n" diffracted light beam members 408(n) that propagate over progressive smaller optical path lengths due to the angular orientation ($\theta°_y$) subjecting the first external major surface 411 to a positive slope. A magnitude of the differential phase shift can be defined at least in part by the progressively smaller optical path lengths in the birefringent optical element 410. In other embodiments, an opposing angular orientation can be selected such that the first external major surface 411 has a negative slope and the "n" diffracted light beam members 408(n) corresponding to the top-most light ray 407 propagates over the shortest optical path length between the diffraction grating 405 and the birefringent optical element 410 in comparison to each of the remaining "n" diffracted light beam members 408(n) that propagate over progressive longer distances. Accordingly, in one exemplary implementation, the angular orientation ($\theta°_y$) of the birefringent optical element 410 is substantially equal to −45 degrees with respect to the transverse axis 426.

Irrespective of the configuration, the "n" diffracted light beam members 408(n) propagate out of the opposing external major surface 412 of the birefringent optical element 410 and traverse the polarizer 415. The polarizer 415 provides an interferometric effect that is indicative of in-phase and out-of-phase relationships in the "n" diffracted light beam members 408(n). The focusing lens 425 is arranged to receive the "n" diffracted light beam members 408(n) after propagation through the polarizer 415 and to direct "n" subsets of light beams towards "n" focal points respectively. Thus, a first subset of combinatorial light beams 126a is directed towards a first focal point, a second subset of light beams 126b is directed towards a second focal point, and an "$n^{th}$" subset of light beams 126n is directed towards an "$n^{th}$" focal point. It can be understood that each of the "n" subset of combinatorial light beams 126a through 126n constitutes light output in combinatorial form. In this example embodiment, a first optical fiber 432 is arranged with an end facet of the first optical fiber 432 at the first focal point such that the first subset of combinatorial light beams 126a is directed into the first optical fiber 432. A second optical fiber 433 is similarly arranged with an end facet of the second optical fiber 433 at the second focal point such that the second subset of light beams 126b is directed into the second optical fiber 433. In other embodiments, one or both of the first optical fiber 432 and the second optical fiber 433 can be replaced with an optical detector that executes an optical-to-electrical conversion for further processing by additional circuitry (not shown) to derive distance information of the target object 120 shown in FIG. 1.

It will be pertinent to point out that the cooperative arrangement of the diffraction grating 405, the birefringent optical element 410, and the polarizer 415 produces a multi-phase set of optical beams (the "n" diffracted light beam members 408(n)), which are selectively combined by the focusing lens 425 to produce "n" subset of beams. Each of the "n" subset of beams is derived by combining various diffracted light beam members from various portions of the composite beam 107. The combination action can be understood by examining the various light beams indicated in FIG. 4 using various line formats (solid, dashed, etc.). For example, the first subset of combinatorial light beams 126a is formed by combining a first light beam member (solid line) from one of the "n" diffracted light beam members 408(n) corresponding to the top-most light ray 407 with a single light beam member (solid line) from one of the "n" diffracted light beam members 408(n) corresponding to the center light ray 407, and a single light beam member (solid line) from one of the "n" diffracted light beam members 408(n) corresponding to the lower-most light ray 407. It should be understood that though only three light beam members are described here for convenience, the same action is applicable to the very large number of light rays contained in the composite beam 107.

The quarter-wave plate 420 shown in FIG. 4 is an optional element that can be included in some implementations and serves to minimize or eliminate any reflections that may occur in the focusing lens 425 (or other objects) and propagate back towards the polarizer 415.

Figure 5:
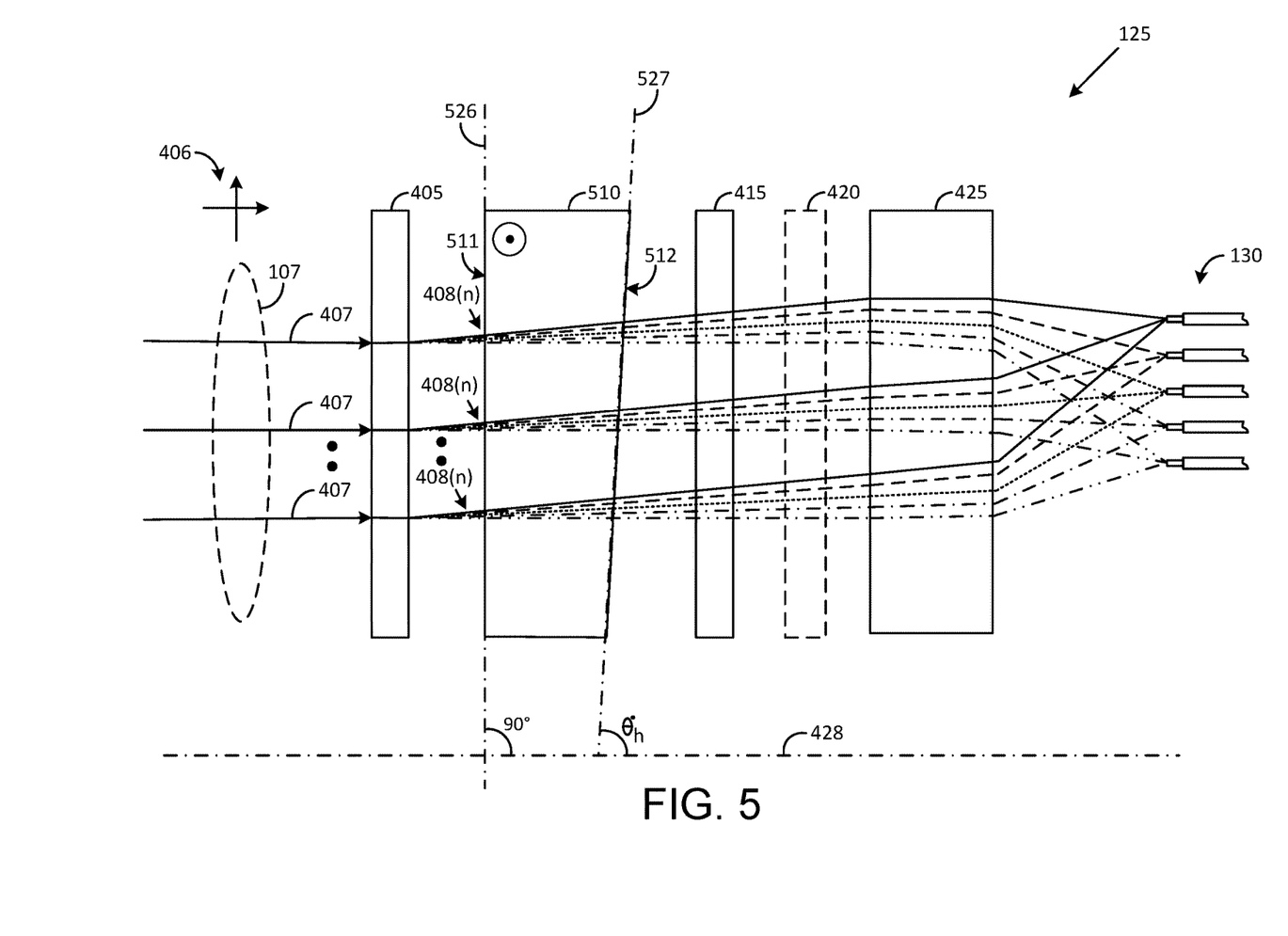
FIG. 5 shows another exemplary embodiment of a multi-phase beam combining system in accordance with the disclosure.

FIG. 5 shows another exemplary embodiment of a multi-phase beam combining system 125 in accordance with the disclosure. In this exemplary embodiment, the multi-phase beam combining system 125 includes the diffraction grating 405, the polarizer 415, the focusing lens 425, and the optional quarter-wave plate 420, each of which is described above with reference to FIG. 4. However, in this exemplary embodiment, the birefringent optical element 410 shown in FIG. 4 is replaced with a birefringent optical element 510 that is different.

More particularly, in this exemplary embodiment, the birefringent optical element 510 is a multifaceted optical element arranged such that a first external planar surface 511 is aligned with a transverse axis 526 of the multi-phase beam combining system 125. The optical path length between the diffraction grating 405 and the first planar surface 511 of the birefringent optical element 510 is the same for each of the "n" diffracted light beam members 408(*n*). The birefringent optical element 510 further includes a sloping opposing external planar surface 512 that has an angular orientation ($\theta°_h$) with respect to the light-propagation axis 428 of the multi-phase beam combining system 125 ($\theta°_h$ can range from >0° and <90°). In one exemplary implementation, $\theta°_h$ is selected to correspond to about 89 degrees. The sloping opposing external planar surface 512, which has a positive slope, provides for each of the "n" diffracted light beam members 408(*n*) corresponding to the top-most light ray 407 having a longer optical path length inside the diffraction grating 405 in comparison to the other "n" diffracted light beam members 408(*n*) that propagate over progressive smaller distances as a result of the angular orientation ($\theta°_h$) of the sloping opposing external planar surface 512. In other embodiments, the angular orientation ($\theta°_h$) of the sloping opposing external planar surface 512 can be in an opposite direction such that ($\theta°_h$>90° and <180°), whereby the sloping opposing external planar surface 512 has a negative slope and each of the "n" diffracted light beam members 408(*n*) propagates over progressive smaller distances with respect to the "n" diffracted light beam members 408(*n*) corresponding to the top-most light ray 407. Furthermore, in other exemplary embodiments, in lieu of the sloping opposing external planar surface 512, the major external surface opposing the first external planar surface 511 can have a non-planar surface contour. The non-planar surface contour can be used to provide non-linear, progressively varying optical path lengths to the "n" diffracted light beam members 408(*n*), and a magnitude of the differential phase shift can be defined at least in part by the non-linear progressively varying optical path lengths that are different from each other. Furthermore, the non-planar surface contour can be selected to have a monotonically increasing curvature and/or a monotonically decreasing curvature in various exemplary implementations.

In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. Persons of skill in the art will understand that many such variations can be made to the illustrative embodiments without deviating from the scope of the invention.

What is claimed is:

1. A homodyne interferometer comprising:
   an optical beam guidance system configured to:
   receive a coherent beam of light;
   split the coherent beam of light into a first light component having a first polarization and a second light component having a second polarization;
   direct the first light component towards a reference object;
   direct the second light component towards a target object;
   receive from the reference object, a first reflected light component having the first polarization;
   receive from the target object, a second reflected light component having the second polarization; and
   output a composite beam that includes the first reflected light component having the first polarization and the second reflected light component having the second polarization; and
   a multi-phase beam combining system comprising:
   a diffraction grating arranged to receive the composite beam from the optical beam guidance system and to produce therefrom, a diffracted plurality of light beam members;
   a multifaceted birefringent optical element arranged to receive the diffracted plurality of light beam members from the diffraction grating and to propagate each of the diffracted plurality of light beam members over a respective optical path through the multifaceted birefringent optical element, each of the diffracted plurality of light beam members having the first polarization undergoing a differential phase shift with respect to each of the diffracted plurality of light beam members having the second polarization, the differential phase shift based at least in part on an angular inclination of at least one major external surface of the multifaceted birefringent optical element with respect to a light-propagation axis of the multi-phase beam combining system, wherein the at least one major external surface is a sloping planar surface of the multifaceted birefringent optical element, the sloping planar surface having a slope angle that defines the angular inclination with respect to the light-propagation axis of the multi-phase beam combining system;
   a polarizer arranged to receive the diffracted plurality of light beam members after propagation through the multifaceted birefringent optical element and to provide an interferometric effect that is indicative of in-phase and out-of-phase relationships in the diffracted plurality of light beam members; and
   a focusing lens arranged to receive the diffracted plurality of light beam members after propagation through the polarizer and to at least direct a first subset of light beams towards a first focal point and a second subset of light beams towards a second focal point.

2. The homodyne interferometer of claim 1, wherein the multifaceted birefringent optical element is a parallel plate optical element arranged to provide the angular inclination at each of two opposing external major surfaces with respect to the light-propagation axis of the multi-phase beam combining system.

3. The homodyne interferometer of claim 2, wherein a magnitude of the differential phase shift is defined at least in part by a thickness of the parallel plate optical element and an angle at which the parallel plate optical element is arranged with respect to the light-propagation axis of the multi-phase beam combining system.

4. The homodyne interferometer of claim 1, wherein the sloping planar surface is configured to provide progressively smaller optical path lengths to each of a respective one of the diffracted plurality of light beam members propagating through the multifaceted birefringent optical element.

5. The homodyne interferometer of claim 4, wherein a magnitude of the differential phase shift is defined at least in part by the progressively smaller optical path lengths.

6. A homodyne interferometer comprising:
an optical beam guidance system configured to output a composite beam that includes a first reflected light component having a first polarization and a second reflected light component having a second polarization; and
a multi-phase beam combining system comprising:
a diffraction grating arranged to receive the composite beam from the optical beam guidance system and to produce therefrom, a diffracted plurality of light beam members;
a multifaceted birefringent optical element arranged to receive the diffracted plurality of light beam members from the diffraction grating and to propagate each of the diffracted plurality of light beam members over a respective optical path through the multifaceted birefringent optical element, each of the diffracted plurality of light beam members having the first polarization undergoing a differential phase shift with respect to each of the diffracted plurality of light beam members having the second polarization, the differential phase shift based at least in part on an angular inclination of at least one major external surface of the multifaceted birefringent optical element with respect to a light-propagation axis of the multi-phase beam combining system, wherein the at least one major external surface is a sloping planar surface of the multifaceted optical element, the sloping planar surface having a slope angle that defines the angular inclination with respect to the light-propagation axis of the multi-phase beam combining system;
a polarizer arranged to receive the diffracted plurality of light beam members after propagation through the birefringent optical element and to provide an interferometric effect that is indicative of in-phase and out-of-phase relationships in the diffracted plurality of light beam members; and
a focusing lens arranged to receive the diffracted plurality of light beam members after propagation through the polarizer and to at least direct a first subset of light beams towards a first focal point and a second subset of light beams towards a second focal point.

7. The homodyne interferometer of claim 6, wherein the multifaceted birefringent optical element is a parallel plate optical element arranged to provide the angular inclination at each of two opposing external major surfaces with respect to the light-propagation axis of the multi-phase beam combining system.

8. The homodyne interferometer of claim 6, wherein the diffraction grating is selected to produce "n" diffracted light beam members from the composite beam, and further wherein the focusing lens is selected to direct the "n" diffracted light beam members towards "n" focal points.

9. The homodyne interferometer of claim 8, wherein n≥2.

10. The homodyne interferometer of claim 8, wherein the "n" diffracted light beam members output from the focusing lens are indicative of a differential phase shift between the first polarization and the second polarization.

11. The homodyne interferometer of claim 8, further comprising:
"n" optical fibers, each individual optical fiber of the "n" optical fibers arranged at a respective one of the "n" focal points to receive a respective one of the "n" diffracted light beam members.

12. The homodyne interferometer of claim 8, further comprising:
"n" photodetectors, each individual optical detector of the "n" photodetectors arranged at a respective one of the "n" focal points to receive a respective one of the "n" diffracted light beam members.

13. A homodyne interferometer comprising:
an optical beam guidance system configured to:
receive a coherent beam of light;
split the coherent beam of light into a first light component having a first polarization and a second light component having a second polarization;
direct the first light component towards a reference object;
direct the second light component towards a target object;
receive from the reference object, a first reflected light component having the first polarization;
receive from the target object, a second reflected light component having the second polarization; and
output a composite beam that includes the first reflected light component having the first polarization and the second reflected light component having the second polarization; and
a multi-phase beam combining system comprising:
a diffraction grating arranged to receive the composite beam from the optical beam guidance system and to produce therefrom, a diffracted plurality of light beam members;
a birefringent optical element arranged to receive the diffracted plurality of light beam members from the diffraction grating and to propagate each of the diffracted plurality of light beam members over a respective optical path through the birefringent optical element, each of the diffracted plurality of light beam members having the first polarization undergoing a differential phase shift with respect to each of the diffracted plurality of light beam members having the second polarization, the differential phase shift based at least in part on an angular inclination of at least one major external surface of the birefringent optical element with respect to a light-propagation axis of the multi-phase beam combining system, wherein the at least one external major surface has a non-planar surface contour;
a polarizer arranged to receive the diffracted plurality of light beam members after propagation through the birefringent optical element and to provide an interferometric effect that is indicative of in-phase and out-of-phase relationships in the diffracted plurality of light beam members; and
a focusing lens arranged to receive the diffracted plurality of light beam members after propagation through the polarizer and to at least direct a first subset of light beams towards a first focal point and a second subset of light beams towards a second focal point.

14. The homodyne interferometer of claim 13, wherein the non-planar surface contour is selected to provide two or more optical path lengths that are different from each other.

15. The homodyne interferometer of claim 14, wherein a magnitude of the differential phase shift is defined at least in part by the non-planar surface contour.

16. The homodyne interferometer of claim 13, wherein the birefringent optical element is a parallel plate optical element arranged to provide the angular inclination at each of two opposing external major surfaces with respect to the light-propagation axis of the multi-phase beam combining system.

17. The homodyne interferometer of claim 16, wherein a magnitude of the differential phase shift is defined at least in part by a thickness of the parallel plate optical element and an angle at which the parallel plate optical element is arranged with respect to the light-propagation axis of the multi-phase beam combining system.

* * * * *